(12) United States Patent
Padovani

(10) Patent No.: US 6,275,485 B1
(45) Date of Patent: Aug. 14, 2001

(54) NOISE CHARACTERIZATION IN A WIRELESS COMMUNICATION SYSTEM

(75) Inventor: Roberto Padovani, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/204,926

(22) Filed: Dec. 3, 1998

(51) Int. Cl.$^7$ .............................. H04L 27/06; H04B 1/10
(52) U.S. Cl. ............................................. 370/342; 375/349
(58) Field of Search .......................... 370/342; 375/341, 375/346–349

(56) References Cited

U.S. PATENT DOCUMENTS

| | | | |
|---|---|---|---|
| 4,901,307 | 2/1990 | Gilhousen et al. | 370/18 |
| 5,056,109 | 10/1991 | Gilhousen et al. | 379/59 |
| 5,103,459 | 4/1992 | Gilhousen et al. | 375/1 |
| 5,109,390 | 4/1992 | Gilhousen et al. | 375/1 |
| 5,245,629 | 9/1993 | Hall | 375/1 |
| 5,396,516 | 3/1995 | Padovani et al. | 375/225 |
| 5,414,796 | 5/1995 | Jacobs et al. | 395/2.3 |
| 5,416,797 | 5/1995 | Gilhousen et al. | 375/705 |
| 5,548,808 | 8/1996 | Bruckert et al. | 455/33.2 |
| 5,559,790 | 9/1996 | Yano et al. | 370/18 |
| 5,566,206 | 10/1996 | Butler et al. | 375/225 |
| 5,568,483 | 10/1996 | Padovani et al. | 370/84 |
| 5,577,025 | 11/1996 | Skinner et al. | 370/22 |
| 5,603,096 | 2/1997 | Gilhousen et al. | 455/69 |
| 5,671,221 | * 9/1997 | Yang | 370/342 |
| 5,721,754 | 2/1998 | Chen | 375/227 |
| 5,754,533 | 5/1998 | Bender et al. | 370/252 |
| 5,774,496 | * 6/1998 | Butler et al. | 375/341 |
| 5,799,034 | * 8/1998 | Walley et al. | 375/346 |

FOREIGN PATENT DOCUMENTS

| | | |
|---|---|---|
| 0472511 | 2/1992 | (EP) . |
| 0739117 | 10/1996 | (EP) . |
| 2742613 | 6/1997 | (FR) . |
| 9604718 | 2/1996 | (WO) . |

OTHER PUBLICATIONS

Mengali, et al. "Soft–Decision–Based Node Synchronization for Viterbi Decoders" IEEE Transactions on Communications 43(9): 2532–2539 (1995).

Yasuda, et al. "Development of Variable–Rate Viterbi Decoder and Its Performance Characteristics" Proceedings of the International Conf. On Digital Satellite Communications 6:XII–24–XII–31 (1983).

* cited by examiner

Primary Examiner—Chau Nguyen
Assistant Examiner—Phuongchau Ba Nguyen
(74) Attorney, Agent, or Firm—Philip Wadsworth; Sean English; S. Hossain Beladi

(57) ABSTRACT

The character of the noise in a series of incoming symbols received over a wireless link is determined. A series of corresponding bits are recovered based upon the series of incoming symbols. The series of corresponding bits are encoded to determine a series of recovered symbols. A vector product of the series of incoming symbols and the series of recovered symbols is determined. A difference between two symbols within the vector product is determined, wherein the two symbols were transmitted over the wireless link in close temporal proximity to one another. The expected value of a non-orthogonal noise portion of the series of incoming symbols is determined based upon an expected value of the difference between the two symbols.

15 Claims, 4 Drawing Sheets

NOISE CHARACTERIZATION IN A WIRELESS COMMUNICATION SYSTEM

BACKGROUND OF THE INVENTION

I. Field of the Invention

The invention relates generally to wireless communications. More particularly, the invention relates to signal characterization in a wireless communication system.

II. Description of the Related Art

In a typical wireless communication system, a plurality of remote units communicate through a common base station. FIG. 1 is a block diagram showing a typical modern wireless communication system 10. The system is comprised of a series of base stations 14. A set of remote units 12 communicate with the base stations 14. The remote units 12 communicate with the base stations 14 over a forward link channel 18 and a reverse link channel 20. For example, FIG. 1 shows a hand-held portable telephone, a vehicle mounted mobile telephone and a fixed location wireless local loop telephone. Such systems offer voice and data services. Other modern communication systems operate over wireless satellite links rather than through terrestrial base stations.

In order for multiple remote units to communicate over a common channel, a means of multiplexing the signal onto the forward link and reverse link channels must be used. One commonly used method is code division multiple access (CDMA). Additional information concerning CDMA is set forth in the TIA/EIA Interim Standard entitled "Mobile Station—Base Station Compatibility Standard for Dual-Mode Wideband Spread Spectrum Cellular System," TIL/EIA/IS-95-A, and its progeny, the contents of which are incorporated herein by reference. In a CDMA system, the forward and reverse link signals are modulated with a spreading code which spreads the signal energy over a band of frequencies. By correlating the incoming signal with the spreading sequences used in the transmitting units, the signals which are transmitted in the same frequency band at the same time can be distinguished from one another at the receiving unit.

In general, CDMA systems operate most efficiently when each remote unit receives the forward link signal at the minimum signal quality which is necessary in order to accurately decode the incoming signal. If the forward link signal arrives at the remote unit at a level that is too low, the signal level may not be sufficient to support reliable communications. If the forward link signal arrives at the remote unit at a level that is too high, the signal acts as unnecessary interference to other remote units. Therefore, the remote unit monitors the signal quality at which the signal is received and requests an increase in the power level at which the base station transmits the forward link signal if the signal quality is too low and requests a decrease in the power level at which the base station transmits the forward link signal if the signal quality is above the threshold.

In order to implement such a system, in one embodiment, the remote unit estimates the forward link signal quality by determining the signal-to-noise ratio at which it receives the forward link signal. The signal-to-noise ratio can be determined by finding the ratio of the energy per bit to the non-orthogonal noise power density $E_b/N_t$). The energy per bit is a measure of the energy associated with a single information bit. Typically, signal-to-noise ratios are determined over a series of bits so that an average energy per bit is determined and used as the numerator of the signal-to-noise ratio.

FIG. 2 is a block diagram of a receiver which determines an average energy per bit. A decoder 30 receives a signal vector $\vec{r}$ corresponding to a series of N symbols which make up a frame such that $\vec{r} = (r_1, r_2, \ldots, r_N)$. Each symbol, $r_n$, is comprised of a signal portion and a noise portion as shown in Equation 1 below.

$$r_n = s_n + w_n \tag{Eq. 1}$$

wherein:

$r_n$ is a voltage value of the $n^{th}$ symbol;

$s_n$ is the signal portion of the $n^{th}$ symbol in volts; and $w_n$ is the noise portion of the $n^{th}$ symbol in volts. The signal component of each bit sample can be expressed in terms of a voltage level and a polarity as shown in Equation 2.

$$r_n = A_n d_n + w_n \tag{Eq. 2}$$

wherein:

$A_n$ is the absolute value of the voltage level of the $n^{th}$ symbol; and $d_n$ represents the polarity (i.e., digital value) of the $n^{th}$ symbol (i.e., +/−1). In a digital representation, the voltage level $A_n$ is transmitted into a numerical value represented by digital bits.

Referring again to FIG. 2, the decoder 30 receives the symbols corresponding to a frame represented by the vector $\vec{r}$ and converts them to a series of bits. In one embodiment, the decoder 30 is a Viterbi decoder. Typically, the bits output by the decoder 30 are passed to subsequent processing stages (not shown) in order to recreate a transmitted signal. In order to determine the energy associated with the signal energy in the frame, the bits output by the decoder are re-encoded by a re-encoder 32 which operates in a complimentary manner with the decoder 30 such that the output of the re-encoder 32 is the vector $\vec{d} = (d_1, d_2, \ldots d_N)$ where $d_n$ represents the polarity of the $n^{th}$ symbol as defined above.

The vector $\vec{r}$ and the vector $\vec{d}$ are input into a dot product block 34. The dot product block 34 takes the dot product of the two inputs as shown in Equation 3 below.

$$\frac{1}{N}(\vec{r}\cdot\vec{d}) = \frac{1}{N}(r_1 * d_1 + r_2 * d_2 + \ldots + r_N * d_N) \tag{Eq. 3}$$

The output of the square of the dot product block 34 is coupled to a squaring block 36 yielding the result given in Equation 4.

$$\frac{1}{N}(\vec{r}\cdot\vec{d})^2 = \frac{1}{N}[(A_1 d_1 + w_1) * d_1 + (A_2 d_2 + w_2) + \tag{Eq. 4}$$
$$d_2 + \ldots (A_N d_N + w_N) * d_N]^2$$

Note that $d_n^2 = 1$ for all n. We can also assume that the noise component of the vector $\vec{r}$ is a series of independent and identically distributed random variables with zero mean, possibly Gaussian distribution, and, thus, according to well-known principles of stochastic processes, randomly multiplying the individual components by +/−1 does not change the characteristics or average value of the noise. In this way, Equation 4 reduces to Equation 5A as shown below.

$$\frac{1}{N}(\vec{r}\cdot\vec{d})^2 = \left(\frac{1}{N}\sum_{n=1}^{N}A_n + \frac{1}{N}\sum_{n=1}^{N}w_n\right)^2 \quad \text{(Eq. 5A)}$$

$$= \left(\frac{1}{N}\sum_{n=1}^{N}A_n + \varepsilon\right)^2$$

The second term of Equation 5A is, by definition, the mean noise component of the vector $\vec{r}$ and is equal to zero such that Equation 5A reduces to Equation 5B as shown below.

$$\frac{1}{N}(\vec{r}\cdot\vec{d})^2 = \frac{1}{N}\sum_{n=1}^{N}A_n^2 \quad \text{(Eq. 5b)}$$

Thus, the output of the square of the dot product block 34 shows the sum of the energy of the symbols in the frame which is directly related to the energy in each bit of the frame as shown in Equation 6 below.

$$E_b = (\vec{r}\cdot\vec{d})^2/B \quad \text{(Eq. 6)}$$

wherein: B is the number of bits in a frame.

In order to determine the signal-to-noise ratio, an estimate of the noise component of the signal must also be determined. In general, we are only interested in the non-orthogonal portion of the noise, $N_t$, because any orthogonal portion of the noise can be removed by signal processing. Non-orthogonal noise sources include thermal noise, forward link transmissions from neighboring base stations and multipath propagations from the servicing base station. Estimation of the non-orthogonal component of the noise is more difficult than the estimation of the bit energy in general. Although several techniques have been discussed, they tend to be inaccurate or require an excessive amount of processing resources. For example, one means of determining the non-orthogonal noise energy is disclosed in U.S. Pat. No. 5,754,533 entitled "METHOD AND SYSTEM FOR NON-ORTHOGONAL NOISE ENERGY BASED GAIN CONTROL." According to one embodiment of the patent, a pilot channel or other known channel is demodulated and used to determine the non-orthogonal noise level. In such a case, a separate demodulation process is carried out for each multipath component of the signal. Based on the result of the demodulations, a noise component is separately measured for each multipath. The use of a pilot signal increases the costs of the system and decreases the capacity of the system. The demodulation of each separate multipath occurrence and the individual calculations consume significant system resources.

Therefore, there has been a long-felt need in the industry for an efficient determination of non-orthogonal noise characteristics in a digital communication system.

SUMMARY OF THE INVENTION

In order to estimate the orthogonal noise level in a wireless communication system, a series of incoming symbols received over a wireless link are decoded to produce a series of corresponding bits. The series of corresponding bits are encoded to produce a series of recovered symbols. A vector product of the series of incoming symbols and the series of recovered symbols is determined. A difference between two symbols within the vector product which were transmitted over the wireless link in close temporal proximity to one another is determined. The expected value of the difference between the two symbols is determined. The expected value of a non-orthogonal noise portion of the series of incoming symbols is determined based upon the expected value of the differences. In one embodiment, a signal quality of the series of incoming symbols is determined based upon the expected value of the non-orthogonal noise portion.

BRIEF DESCRIPTION OF THE DRAWINGS

The features, objects and advantages of the present invention will become more apparent from the detailed description set forth below when taken in conjunction with the drawings in which like reference characters identify correspondingly throughout and wherein.

DETAILED DESCRIPTION OF THE INVENTION

Providing an efficient and effective means for determining the signal quality of a received signal is an important factor in designing a CDMA wireless system which effectively uses the available capacity. While several effective methods have been developed to measure the signal energy which consumes a reasonable amount of processing resources, to date, the means and methods available for measuring the non-orthogonal noise component have been fairly complex. For example, previously developed schemes involve the estimation of the non-orthogonal noise component based upon demodulation of the pilot signal. Such schemes rely on a set of steps which are performed for each individual multipath propagation of the pilot signal received at the remote unit. Although such a process is effective, it is desirable to find a way to determine the non-orthogonal noise component of a received signal based upon the combined signal rather than the individual multipath components. The invention described herein operates on the combined signal and can be practically implemented without consuming an excessive amount of resources.

Figure 1:
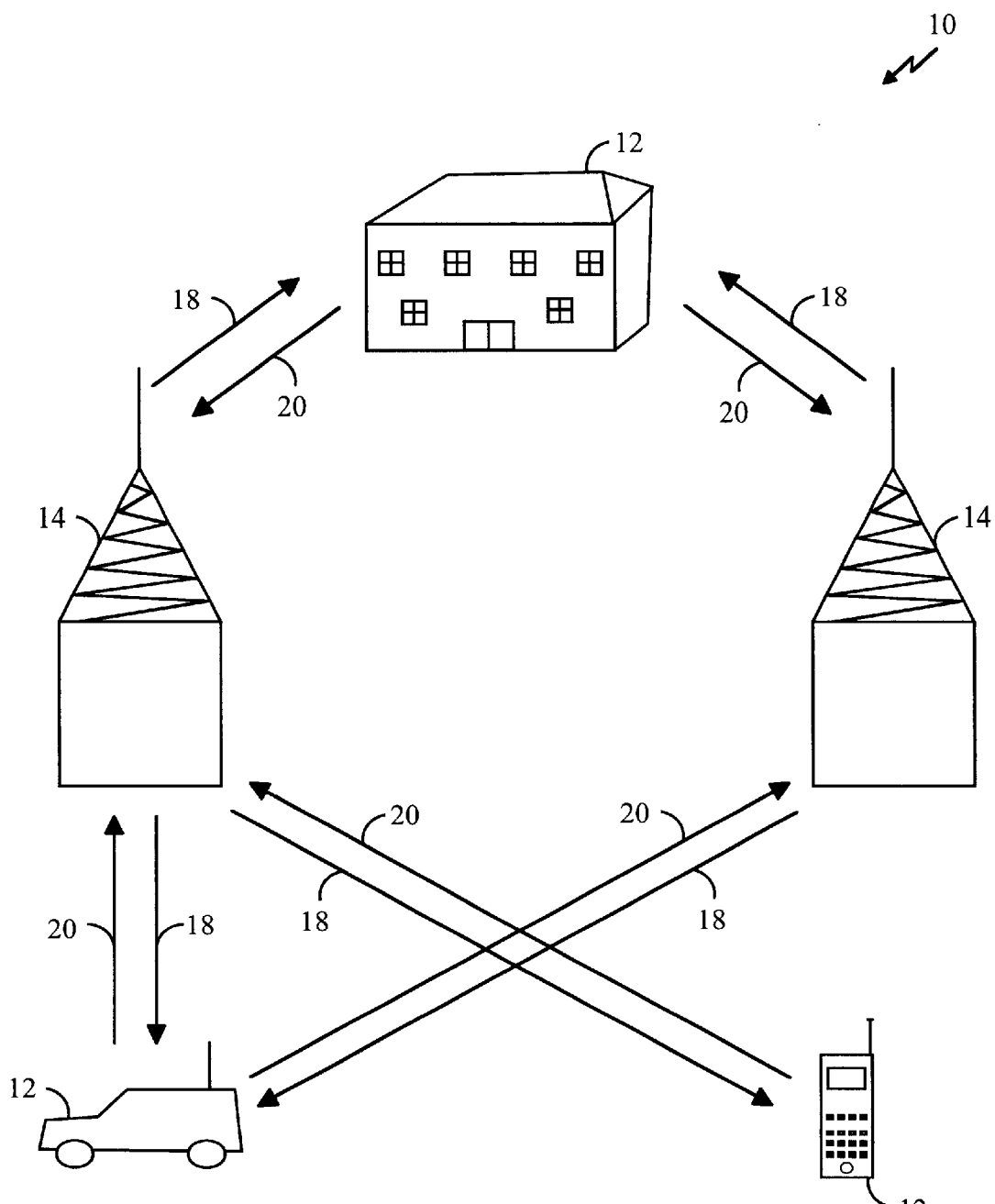
FIG. 1 is a block diagram showing a typical modern wireless communication system.
Figure 2:
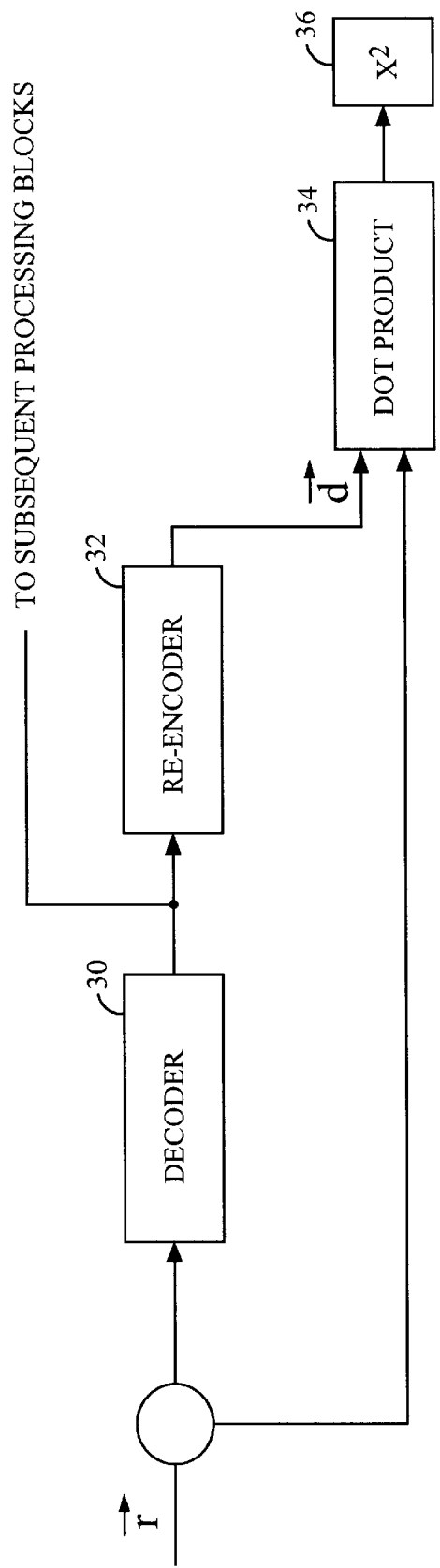
FIG. 2 is a block diagram of a receiver which determines an average energy per bit.
Figure 3:
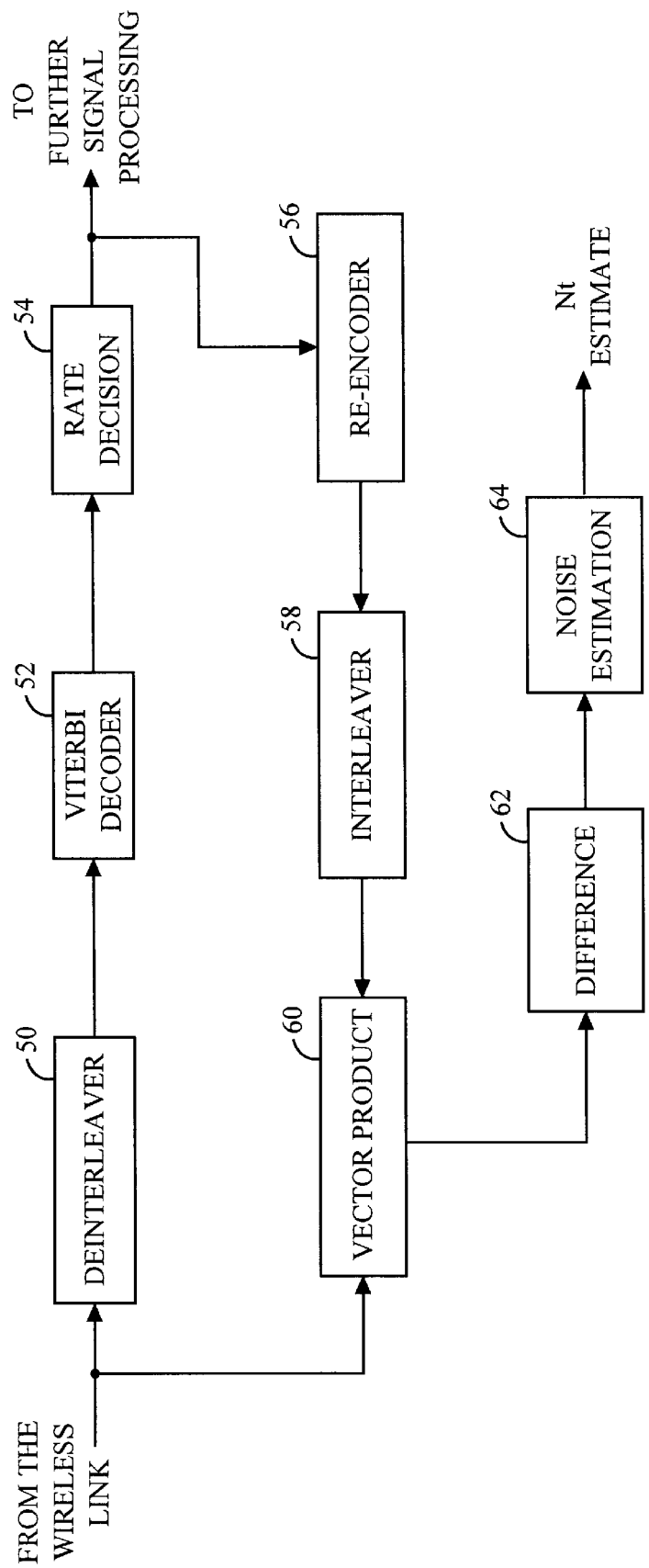
FIG. 3 is a block diagram showing one embodiment of the non-orthogonal noise determination process of the invention.

FIG. 3 is a block diagram showing one embodiment of the non-orthogonal noise determination process. Some of the components (such as a de-interleaver 50, a rate decision block 54 and an interleaver 58) shown in FIG. 3 are dependent upon the processes implemented by the transmitter. These elements are included in the FIG. 3 for the purpose of illustration but may not be necessary in systems which do not incorporate interleaving or multiple data rate transmission. In one embodiment, the components shown in FIG. 3 are incorporated in a remote unit which operates in a cellular environment.

Interleaving is the process by which the symbols output by a Viterbi encoder within a transmitter are re-ordered before transmission. Because of the redundancy introduced by Viterbi encoding, at the output of a Viterbi encoder, successive symbols contain redundant information. Typically, errors introduced during the transmission process operate on a series of consecutive symbols. The Viterbi decoding process can recreate a perfect bit stream from an imperfect symbol stream, if at least a portion of the symbol energy corresponding to any one bit is successfully transmitted. Therefore, in order to reduce the probability that all of the symbols corresponding to a given bit will be corrupted during the transmission process, the symbols are arranged in a non-consecutive order before transmission. At the receiver, the symbols are re-ordered before they are decoded.

The de-interleaver 50 arranges the symbols in the order in which they were produced by the Viterbi encoder at the transmitter. The re-ordered symbols output by the de-interleaver 50 are input into a Viterbi decoder 52. The Viterbi decoder 52 produces a bit stream according to well-known Viterbi decoding techniques. In one embodiment, the transmitter is capable of sending data at more than one data rate. In order to fully decode the data, a decision must be made as to the rate at which the data was sent. The bit stream output by the Viterbi decoder 52 is input into the rate decision block 54. The rate decision block 54 may operate in accordance with, for example, U.S. Pat. Nos. 5,566,206 and 5,774,496 each entitled "METHOD AND APPARATUS FOR DETERMINING DATA RATE OF TRANSMITTED VARIABLE RATE DATA IN A COMMUNICATIONS RECEIVER," assigned to the assignee hereof and incorporated herein by this reference in their entirety. The data rate decision block 54 outputs a series of bits at the rate at which they were transmitted and also, in one embodiment, outputs an indication of that rate. The output of the rate decision block 54 is subjected to further signal processing (not shown). In addition, the output of the rate decision block 54 is passed to a re-encoder 56.

The re-encoder 56 encodes the data in the same manner as the transmitter, thus converting the series of recovered data bits to a series of recovered symbols. The recovered symbols are output from the re-encoder 56 and input into the interleaver 58. The interleaver 58 operates in the same manner as the interleaver in the transmitter and re-orders the recovered symbols in a non-consecutive order corresponding to the order as the incoming symbols were transmitted over the air.

A vector product block 60 multiplies the received vector with the recovered vector. A difference block 62 determines a difference between sets of two values which correspond to two symbols which were transferred in close temporal proximity to one another over the wireless link. A noise estimation block 64 determines the statistical characteristics of noise based upon the statistical characteristics of the output of the difference block 62. In one embodiment, the noise estimation block 64 determines the expected value of the non-orthogonal noise component of the incoming signal. In another embodiment, the output of the noise estimation block 64 is coupled to a signal quality determination unit which determines the signal-to-noise ratio at which the signal is received. In yet another embodiment, the output of the noise estimation block 64 is coupled to a power control block which requests an increase or decrease in transmission power based upon the statistical characteristics of noise.

The blocks shown in FIG. 3 can be embodied in a plurality of media using a variety of well-known techniques. For example, the blocks in FIG. 3 can be embodied in field programmable gate arrays (FPGA), application specific integrated circuits (ASIC), software running on a microprocessor as well as other media.

The operation of the invention may be understood by reference to the following explanation and equations. The received symbols can be expressed in terms of the vector $\vec{r}$ and the individual symbol components of the vector $\vec{r}$ can be expressed as shown below in Equation 7.

$$\vec{r} = [r_1, r_2, \ldots r_N] = [(A_1 d_1 + w_1), (A_2 d_2 + w_2), \ldots (A_N d_N + w_N)] \quad \text{(Eq. 7)}$$

wherein: $r_n$ is a voltage value of the $n^{th}$ symbol;

$w_n$ is the noise portion of the $n^{th}$ symbol in volts;

$A_n$ is the absolute value of the voltage level of the signal portion of the $n^{th}$ symbol; and $d_n$ represents the polarity (i.e., digital value) of the nth symbol (i.e., +/−1). The process of decoding, re-encoding and re-interleaving the received vector $\vec{r}$ produces a recovered vector $\vec{d}$ which represents symbol values in the order in which they were transmitted, e.g. the order in which they were received in the vector $\vec{r}$ as shown in Equation 8.

$$\vec{d} = [d_1, d_2 \ldots d_N] \quad \text{(Eq. 8)}$$

wherein: $d_n$ = polarity of the $n^{th}$ symbol value, (i.e., +/−1).

By taking the vector product of the received vector $\vec{r}$ and the recovered vector $\vec{d}$, Equation 9 is generated.

$$(\vec{r} * \vec{d}) = [(A_1 * d_1 * d_1 + w_1 * d_1), (A_2 * d_2 * d_2 + W_2 * d_2), \ldots, (A_N * d_N * d_N + W_N * d_N)]$$

$$= [(A_1 * d_1^2 + W_1 * d_1), (A_2 * d_2^2 + W_2 * d_2), \ldots, (A_N * d_N^2 + W_N * d_N)]$$

$$= [(A_1 + W_1 * d_1), (A_2 + W_2 * d_2), \ldots, (A_N + W_N * d_N)]$$

$$= [p_1, p_2, \ldots, p_N] = \vec{p} \quad \text{(Eq. 9)}$$

Because $d_n^2$ is equal to one for all values of n, the equation reduces as shown above.

In order to extract the noise component, the difference between two consecutive symbol values is taken as shown below in Equation 10.

$$X_{1,2} = (p_1 - p_2) = A_1 - A_2 + (w_1 * d_1 - w_2 * d_2) \quad \text{(Eq. 10)}$$

Note that if $A_1$ is equal to $A_2$, these values cancel one another and the component which is left is given in Equation 11.

$$X_{1,2} = w_1 d_1 - w_2 d_2 = w_1 - w_2 \quad \text{(Eq. 11)}$$

The noise component of the vector $\vec{r}$ is a series of independent and identically distributed random variables with zero mean, possibly Gaussian distribution, and, thus, according to well-known principles of stochastic processes, randomly multiplying the individual components by +/−1 does not change the characteristics or average value of the noise. Therefore, as shown in Equation 11, the polarity of the symbols, $d_n$, can be removed without a loss of information concerning the characteristics of the non-orthogonal noise.

As is well-known in the art of probability, random variables, and stochastic processes, the expected value of a Gaussian random variable can be estimated by finding the expected value of the difference between the two values of the random variable as shown in Equation 12.

$$E\{(w_i - w_j)^2\} = 2\sigma^2 = N_t \quad \text{(Eq. 12)}$$

However, it should be noted that other estimators exist. For example, if the statistics of the noise are Gaussian, an unbiased estimate of $N_t$ can be obtained by taking the absolute value of the difference between two values of the random variable and multiplying it times a known scaling factor as shown in Equation 13.

$$E\{|w_i-w_j|\}=N_t*K \qquad \text{(Eq. 13)}$$

wherein: K is equal to a known scaling factor.

Use of Equation 13 may be advantageous in some implementations because it avoids a squaring operation which is required by Equation 12, thus, perhaps resulting in faster execution and more efficient use of processing resources. Applying these principles, the noise power can be estimated by summing the squares of the difference over the entire frame as shown in Equation 14.

$$N_t=(X_{1,2}{}^2+X_{3,4}{}^2+\ldots +X_{N-1,N}{}^2)*S \qquad \text{(Eq. 14)}$$

wherein: S is a scaling factor.

As noted above, the invention operates on the assumption that the voltage level corresponding to two consecutive symbols are approximately the same. For example, $A_1$ is equal $A_2$, $A_3$ is equal to $A_4$ and so on. If the symbols are interleaved over a frame for transmission, the difference should be taken between two symbols that were transmitted in close temporal proximity to one another over the channel, such as consecutively or simultaneously. Fortunately, the assumption that the voltage levels of successive signals are equal is valid in many communication systems. For example, if binary phase shift keying (BPSK) modulation is used such as in IS-95-A rate set 1 and rate set 2 operation, the two consecutive symbols are transmitted in sequence at the same power level. Because the symbol duration is typically very small such as on the order of 50 microseconds, the two voltages are nearly equal as the channel does not typically change substantially in 50 microseconds. If quadrature phase shift keying (QPSK) modulation is used, the two symbols can be selected which have been transmitted at the same power level at the same time over the channel. For example, $r_1$ is transmitted on the in-phase channel and $r_2$ is transmitted on the quadrature channel at the same time and, thus, the voltages are theoretically identical.

Figure 4:
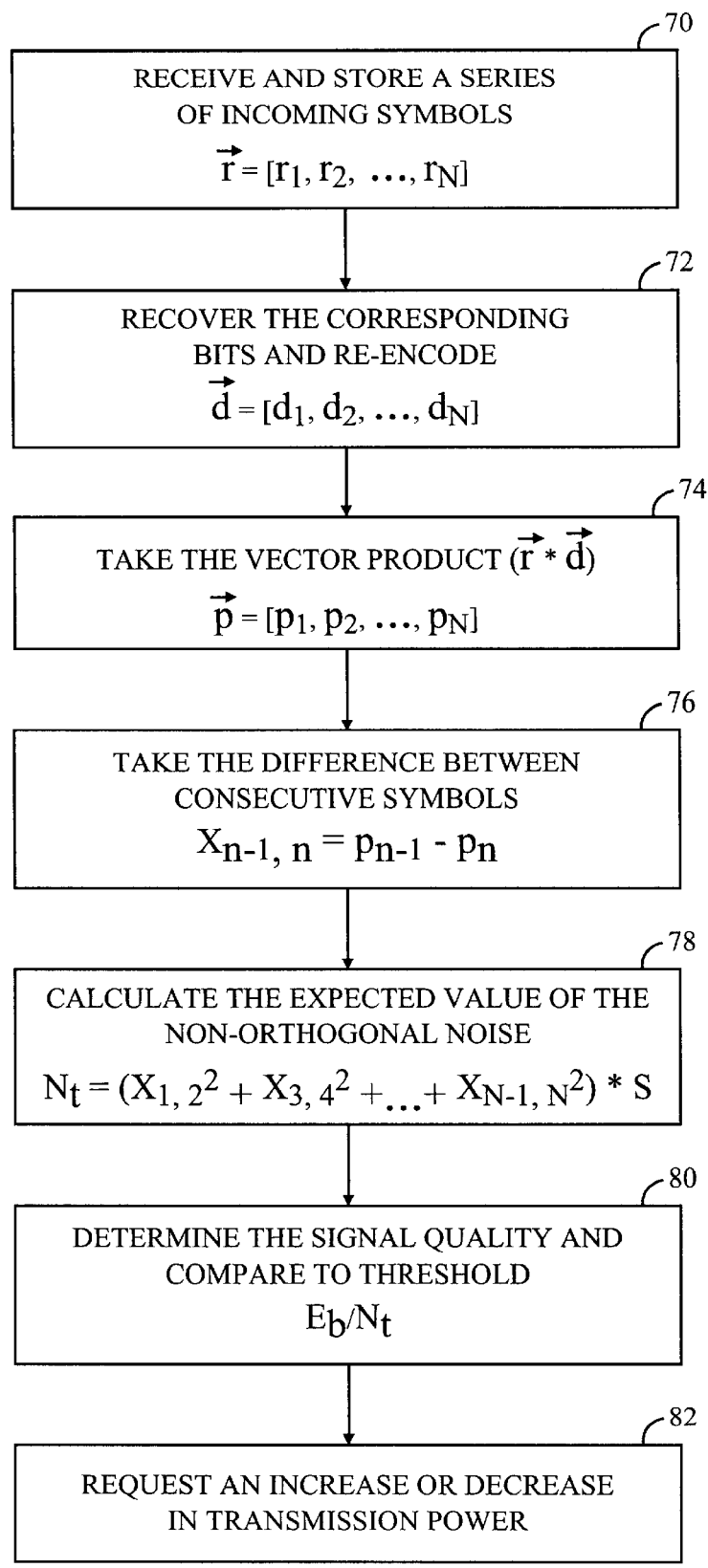
FIG. 4 is a flowchart showing operation of the noise estimation process in accordance with the invention.

FIG. 4 is a flowchart showing the noise characterization process in accordance with the invention. In block 70, a series of incoming symbols are received and stored. In block 72, the corresponding bits are recovered and re-encoded to produce a series of digital bit values. As shown above, in one embodiment, this process involves de-interleaving and re-interleaving the symbols. Also as shown above, in another embodiment, this process involves determination of a transmission rate. In block 74, the vector product of the received symbols and the recovered symbols is taken. In block 76, the difference between corresponding consecutive symbols is taken. In block 78, the expected value of the difference between the consecutive symbols is taken which is directly related to the expected value of the noise component of the stored series of incoming symbols. In block 80, the expected value of the noise is used to determine the signal quality (i.e., Eb/Nt) of the forward link signal. Based upon the signal quality, block 82 requests an increase or decrease in power of the signal. In an alternative embodiment, the block 82 may request an increase or decrease in data rate in a similar manner.

Upon examination of the above written description, a myriad of alternative embodiments within the scope of the invention will be readily apparent to one skilled in the art. For example, in one aspect of the invention, consecutive symbols as transmitted or simultaneous signals as transmitted are subtracted from one another. In the embodiment shown above, this is accomplished by re-ordering the covered symbols and taking the vector product of the received symbols and the recovered symbols. Obviously, in other embodiments, these processes can be accomplished without the actual re-ordering of the recovered symbols. Instead, a mapping algorithm can be used to associate consecutively or simultaneously transmitted symbols without re-ordering. In addition, the invention was described with reference to a Viterbi encoder and Viterbi decoder combination. Other types of encoders and decoders can be used in conjunction with the teachings of the invention. In the description above, a determination of the characteristics of the non-orthogonal portion of the noise is used to determine a signal-to-noise ratio of a forward link signal which is in turn used to request an increase or decrease in forward link transmission power from the base station. In other embodiments, the characteristics of the noise are determined for another purpose such as load determination or access control. In some embodiments, the invention can be used to determine higher order characteristics of the non-orthogonal component of the noise. For example, a higher order moment of the noise can be determined. The invention can be applied on either the forward link or the reverse link and, thus, can be housed at either the base station or the remote unit or other type of unit. The invention can be embodied in terrestrial and satellite systems as well as other types of systems.

The invention may be embodied in other specific forms without departing from its spirit or essential characteristics. The described embodiment is to be considered in all respects only as illustrative and not restrictive and the scope of the invention is, therefore, indicated by the appended claims rather than the foregoing description. All changes which come within the meaning and range of equivalency of the claims are to be embraced within their scope.

What is claimed is:

1. A method of noise estimation, comprising the steps of:
    storing a series of incoming symbols received over a wireless link;
    decoding said series of incoming symbols to produce a series of corresponding bits;
    encoding said series of corresponding bits to produce a series of recovered symbols;
    determining a vector product of said series of incoming symbols and said series of recovered symbols;
    determining a difference between two symbols within said vector product, wherein said two symbols were transmitted over said wireless link in close temporal proximity to one another; and
    determining an expected value of said difference between said two symbols so as to define an expected value of a non-orthogonal noise portion of said series of incoming symbols.

2. The method of claim 1, further comprising the step of arranging said series of recovered symbols in an order corresponding to the order in which said series of incoming symbols were transmitted over said wireless link.

3. The method of claim 1, further comprising the step of determining a data rate at which said series of incoming symbols were transmitted over said wireless link.

4. The method of claim 1, further comprising the step of determining a signal quality of said series of incoming symbols based upon said expected value of said non-orthogonal noise portion.

5. The method of claim 1, further comprising the step of requesting an increase or decrease in transmission power based upon said expected value of said non-orthogonal noise portion.

6. A receiver, comprising:
    means for storing a series of incoming symbols received over a wireless link;

means for decoding said series of incoming symbols to produce a series of corresponding bits;

means for encoding said series of corresponding bits to determine a series of recovered symbols;

means for determining a vector product of said series of incoming symbols and said series of recovered symbols;

means for determining a difference between two symbols within said vector product, wherein said two symbols were transmitted over said wireless link in close temporal proximity to one another; and means for determining an expected value of said difference between said two symbols so as to define an expected value of a non-orthogonal noise portion of said series of incoming symbols.

7. The receiver of claim 6, further comprising means for arranging said series of recovered symbols in an order corresponding to the order in which said series of incoming symbols were transmitted over said wireless link.

8. The receiver of claim 1, further comprising means for determining a data rate at which said series of incoming symbols were transmitted over said wireless link.

9. The receiver of claim 1, further comprising means for determining a signal quality of said series of incoming symbols based upon said expected value of said non-orthogonal noise portion.

10. The receiver of claim 1, further comprising means for requesting an increase or decrease in transmission power based upon said expected value of said non-orthogonal noise portion.

11. A receiver comprising:

a decoder having an input port configured to receive a series of incoming symbols over a wireless link and having an output port configured to produce a series of recovered data bits;

an encoder having an input port coupled to said output port of said decoder and having an output port configured to produce a series of encoded symbols;

a vector product block having a first input port coupled to said output port of said encoder and having a second input port configured to receive said series of incoming symbols and having an output port configured to produce a vector product of said series of encoded symbols and said series of incoming symbols;

a difference block having an input port coupled to said output port of said vector product block and having an output port configured to produce differences between sets of two values of said vector product, wherein said sets of two values correspond to two symbols which were transferred over said wireless link in close temporal proximity to one another; and a noise estimation block having an input port coupled to said output port of said difference block and configured to determine a statistical characteristic of said differences.

12. The receiver of claim 11, further comprising a interleaver coupled between said encoder and said vector product block, said interleaver configured to arrange said series of recovered symbols are in an order corresponding to the order in which said series of incoming symbols were transmitted over said wireless link.

13. The receiver of claim 11, further comprising a rate decision block coupled between said decoder and said encoder, said rate decision block configured to determine a rate at which said series of incoming symbols were transmitted over said wireless link.

14. The receiver of claim 11, further comprising a signal quality determination unit configured to determine a signal quality of said series of incoming symbols based upon said statistical characteristic of said differences.

15. The receiver of claim 11, further comprising a power control block coupled to said noise estimation block, said power control block configured to request an increase or decrease in transmission power based upon said statistical characteristic of said difference.

* * * * *